US012414655B1

(12) United States Patent
Ma

(10) Patent No.: US 12,414,655 B1
(45) Date of Patent: Sep. 16, 2025

(54) EMBEDDED STORAGE TYPE SHOWER DEVICE

(71) Applicant: Yongzhe Ma, Shenzhen (CN)

(72) Inventor: Yongzhe Ma, Shenzhen (CN)

( * ) Notice: Subject to any disclaimer, the term of this patent is extended or adjusted under 35 U.S.C. 154(b) by 74 days.

(21) Appl. No.: 18/607,769

(22) Filed: Mar. 18, 2024

(51) Int. Cl.
*A47K 3/28* (2006.01)
*B05B 1/18* (2006.01)

(52) U.S. Cl.
CPC .............. *A47K 3/281* (2013.01); *B05B 1/185* (2013.01)

(58) Field of Classification Search
CPC ................................ A47K 3/281; E03C 1/025
See application file for complete search history.

(56) References Cited

U.S. PATENT DOCUMENTS

2021/0007558 A1* 1/2021 Schluter .................. F21V 31/00
2023/0399829 A1* 12/2023 Qian ..................... F16K 27/003

FOREIGN PATENT DOCUMENTS

CN 109883055 A * 6/2019

* cited by examiner

*Primary Examiner* — Christine J Skubinna
(74) *Attorney, Agent, or Firm* — JEEN IP LAW, LLC

(57) ABSTRACT

An embedded storage type shower device is provided, which includes: a built-in bottom box; two water outlets at a top of a water distribution valve and a water outlet at a right side thereof are connected to a branch pipe. A water outlet at a top of the water distribution valve is connected to an end of the branch pipe and a top spray fixed seat, a bottom of the top spray fixed seat is fixedly connected to a top spray part. A water outlet at a right of the water distribution valve is connected to an end of the branch pipe and a shower installation seat, the shower installation seat is connected to a handheld shower through a hose. By embedding the built-in bottom box in the wall, an installation of a main water supply pipe and the water distribution valve is improved.

8 Claims, 10 Drawing Sheets

EMBEDDED STORAGE TYPE SHOWER DEVICE

TECHNICAL FIELD

The present disclosure relates to the field of shower components technologies, and in particular, to an embedded storage type shower device.

BACKGROUND

Shower devices generally consist of a switch control component, a handheld showerhead, and a top spray. By installing the shower device in a bathroom, different shower modes can be selected according to a usage requirement to improve a shower experience.

Based on the above, the existing shower devices have the following shortcomings:

A shower device is usually directly connected to an indoor water pipe, sludge carried in a tap water is not filtered through the switch control component. When it reaches a shower nozzle, it is easy to block an outlet hole of the nozzle, which is extremely difficult to clean, thus affecting the shower experience. Moreover, due to a placement of a shower supply far away from a shower position, it is inconvenient to take, the top spray part will still experience intermittent dripping after water interruption, rendering it difficult to clean after use.

SUMMARY

The embodiment disclosed in the present disclosure relates to an embedded storage type shower device, which uses a built-in bottom box as a basic base embedded in a wall to facilitate an installation of a main water supply pipe and a water distribution valve, improving a convenience of installation. A rear end of a press switch in the water distribution valve is connected to a filter screen, which is configured to filter residue in water and prevent the residue from blocking a latex hole of a top spray part or a handheld shower.

A first aspect of the present disclosure provides an embedded storage type shower device, specifically including: a built-in bottom box; a front top of the built-in bottom box is fixedly provided with a main water supply pipe and a water distribution valve, a front side of the water distribution valve is thread connection with three press switches, the front top of the built-in bottom box is clamped with a decorative cover plate, a front side of the built-in bottom box is clamped with an external decorative panel, two water outlets at a top of the water distribution valve and a water outlet at a right side thereof are connected to a branch pipe, an end of the branch pipe connected to the water outlet at a top of the water distribution valve is connected to a top spray fixed seat, a bottom of the top spray fixed seat is fixedly connected to a top spray part, an end of the branch pipe connected to the water outlet at a right side of the water distribution valve is connected to a shower installation seat, the shower installation seat is connected to a handheld shower through a hose.

In an implementation mode of the present disclosure, the built-in bottom box is embedded in a wall, a top of the built-in bottom box is fixedly provided with an "L"-shape installation convex frame, a top of the installation convex frame is equidistantly provided with three magnetic suction connection columns, two limit sliding grooves are symmetrically provided on an inner wall of a top inner side of the built-in bottom box, a left and right inner walls of the limit sliding groove are provided with a teeth slot, three sets of limit teeth are evenly spaced on a front side of an inner wall at a bottom of the built-in bottom box.

In an implementation mode of the present disclosure, a right end of the main water supply pipe is connected to a left end of the water distribution valve as a whole, the right end of the main water supply pipe and the water distribution valve are fixedly connected to the installation convex frame at a top of the built-in bottom box through a bolt, a temperature regulation valve is provided at a connection between a left side of the main water supply pipe and a the top thereof that is connected to a water pipe, the main water supply pipe at a right side of the temperature regulation valve is provided with a water volume switch, front ends of the temperature regulation valve and the water volume switch are both clamped with a knob.

In an implementation mode of the present disclosure, a water outlet of the water distribution valve is provided with a corresponding water diversion, the water diversion is thread connection with the press switch, a rear end of the press switch is connected to a filter screen in the water distribution valve, a front end of the press switch is connected to a button, an end of each water outlet is sleeved with a locking buckle.

In an implementation mode of the present disclosure, the decorative cover plate is fastened to a front side of the main water supply pipe and the water distribution valve, three magnetic suction columns are symmetrically provided at a top of a rear wall of the decorative cover plate at an equal distance, a rear end of the magnetic suction column is inserted into a magnetic suction connection column at a top of the built-in bottom box, two "T"-shape connection slot are symmetrically provided at a bottom of a rear wall of the decorative cover plate, the connection slot is provided with a "T"-shape limit clamp block, left and right sides at a rear of the limit clamp block is provided with a fixed teeth, two fixed clamp grooves are symmetrically provided at a top of the decorative cover plate.

In an implementation mode of the present disclosure, a rectangular arc-shaped cover groove is provided at a top of a front side wall of the external decorative panel, the cover groove is clamped on a front side of the decorative cover plate, two connection clamp blocks are symmetrically provided on a rear of the cover groove, the connection clamp block is clamped in a fixed clamp groove provided at a top of the decorative cover plate, a bottom of a front side wall of the external decorative panel forms an inner concave shape to form a storage groove; a bottom of a rear side wall of the external decorative panel is provided with three limit rods at an equal distance, a bottom of the limit rod is provided with a tooth groove, a bottom of the limit rod is clamped to a top of the limit tooth of the built-in bottom box.

In an implementation mode of the present disclosure, the top spray fixed seat is in a "┌⊓┐" shape, two splitter pipes are provided in the top spray fixed seat, a rear end of the splitter pipe is connected to the branch pipe, a bottom of the splitter pipe is inserted into a connection port at a top rear end of the top spray part, two fixed connection holes that run through are symmetrically provided at a top of a front end of the top spray fixed seat.

In an implementation mode of the present disclosure, a bottom of the top spray part is provided with two water outlet modes, a partition is provided in a middle of an inner cavity of the top spray part, an insertion tube connected to a bottom of one connection port passes through the partition and is connected to a front of an inner cavity of the top spray part, a top rear of the top spray part is symmetrically provided with two fixed columns inserted into the fixed connection hole of the top spray fixed seat and connected by a fixed bolt, a front side of the inner cavity of the top spray part is connected with a push scraper, three springs are provided at a connection between a front side of the push scraper and a front wall of the inner cavity of the top spray part at an equal distance.

Compared with existing technology, the beneficial effects of the present disclosure are as follows:

1. By embedding a built-in bottom box in a wall as a basic base, an installation of a main water supply pipe and a water distribution valve can be improved, which improves a convenience of installation. In addition, a press switch that is thread connection in the water distribution valve is connected to a filter screen at a rear end to filter residue in water, avoiding residue blocking a latex hole of a top spray part or a handheld shower.
2. By matching a decorative cover plate with an external decorative panel, a front side of the built-in bottom box is aesthetically decorated. A bottom of a front wall of the external decorative panel forms an inner concave shape to form a storage groove, which can temporarily store a shower supply and improve a convenience of retrieving an item during showering.
3. The top spray part is connected upwards from a bottom of a top spray fixed seat, two fixed columns are inserted into a fixed connection hole, them are connected through a fixed bolt. A connection port at a top of the top spray part is inserted into a bottom of a diversion pipe, which can fix the top spray part at a bottom of the diversion pipe and allow water to flow. A front side of an inner cavity of the top spray part slides and connects to a push scraper when water is flowing, a water pressure will push the push scraper forward, so that a front side of the top spray part can flow out normally. When water is cut off, a spring will push the push scraper backward, thereby pushing the water backward and avoiding intermittent dripping of the top spray part.

BRIEF DESCRIPTION OF DRAWINGS

In order to provide a clearer explanation of the technical solution of the embodiments of the present disclosure, the drawings of the embodiments will be briefly introduced below.

The drawings in the following description only relate to some embodiments of the present disclosure, rather than limiting the present disclosure.

NUMERAL REFERENCE

Figure 1:
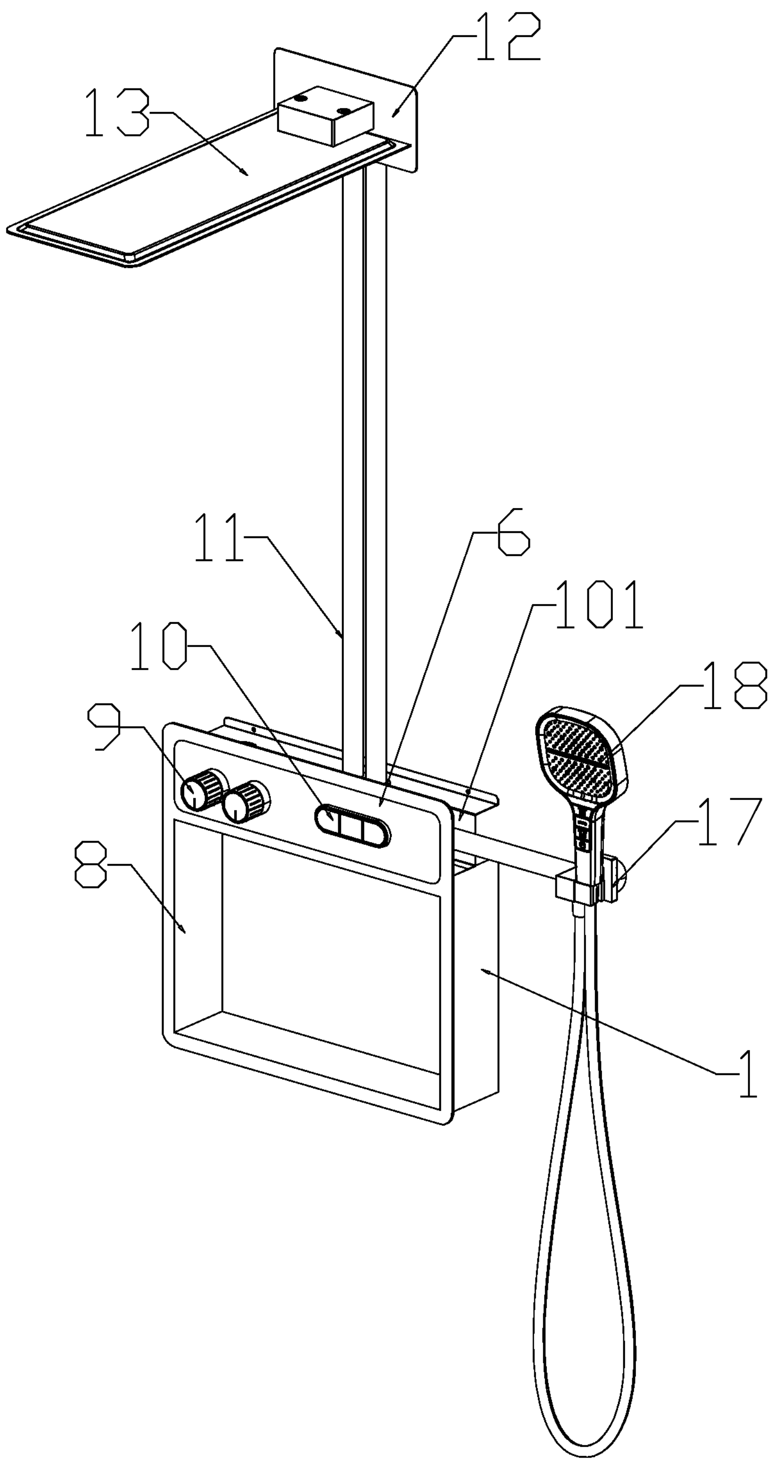
FIG. 1 is a schematic diagram of an overall axial side structure of an embedded storage type shower device in an embodiment of the present disclosure.

1. Built-in bottom box; 101. Installation convex frame; 102. Limit sliding groove; 103. Magnetic suction connection column; 104. Limit tooth; 2. Main water supply pipe; 201. Temperature regulation valve; 202. Water volume switch; 3. Water distribution valve; 301. Water diversion; 302. Water outlet; 4. Press switch; 401. Filter screen; 5. Locking buckle; 6. Decorative cover plate; 601. Magnetic suction column; 602. Connection slot; 603. Fixed clamp groove; 7. Limit clamp block; 701. Fixed teeth; 8. External decorative panel; 801. Cover groove; 802. Connection clamp block; 803. Limit rod; 9. Knob; 10. Button; 11. Branch pipe; 12. Top spray fixed seat; 1201. Splitter pipe; 1202. Fixed connection hole; 13. Top spray part; 1301. Fixed column; 1302. Connection port; 1303. Insertion tube; 14. Fixed bolt; 15. Push scraper; 16. Spring; 17. Shower installation seat; 18. Handheld shower.

DESCRIPTION OF EMBODIMENTS

In order to render the purpose, scheme, and advantages of the technical solution of the present disclosure clearer, the following text will provide a clear and complete description of the technical solution of the specific embodiments of the present disclosure in combination with the drawings. Unless otherwise specified, terms used in this specification have the usual meanings in the field. The same symbol in the drawings represents the same component.

Embodiment 1

Figure 2:
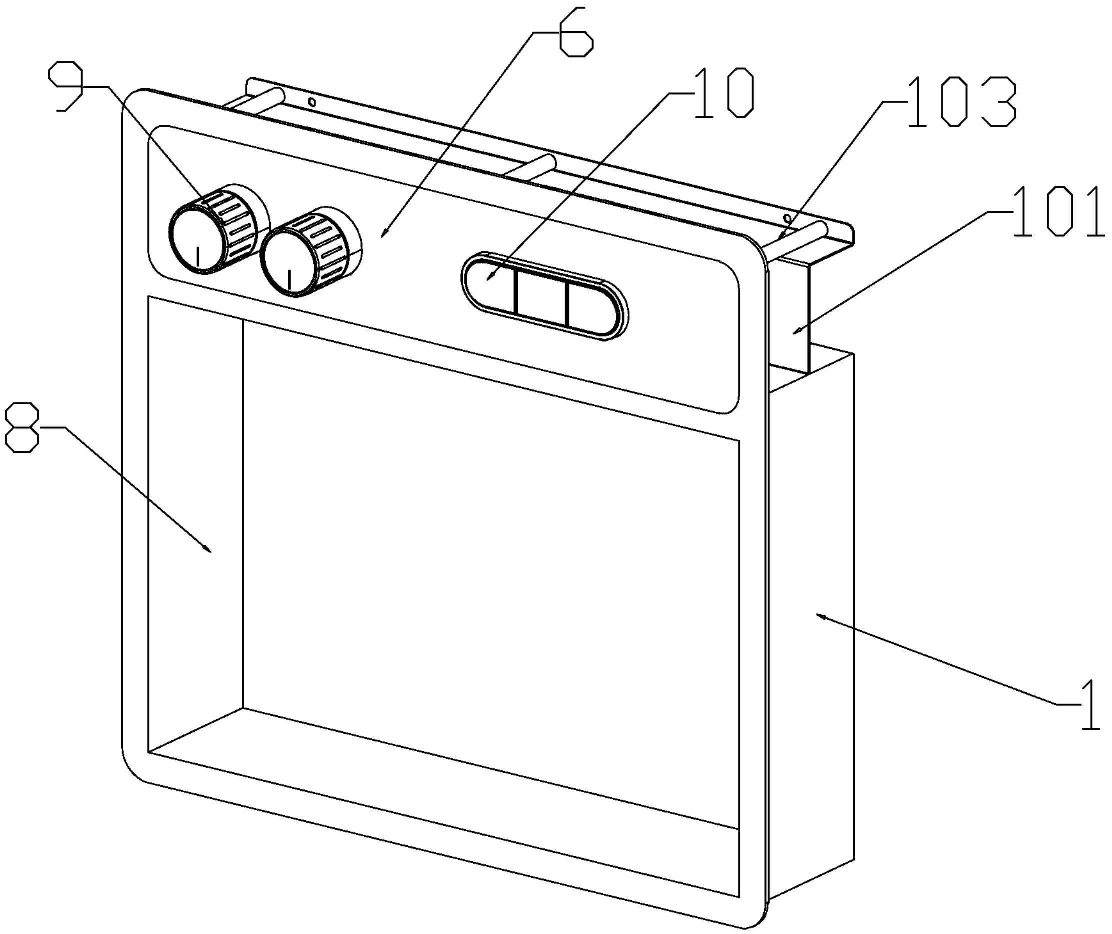
FIG. 2 is a schematic diagram of an axial side structure of a built-in bottom box of the embedded storage type shower device in an embodiment of the present disclosure.
Figure 3:
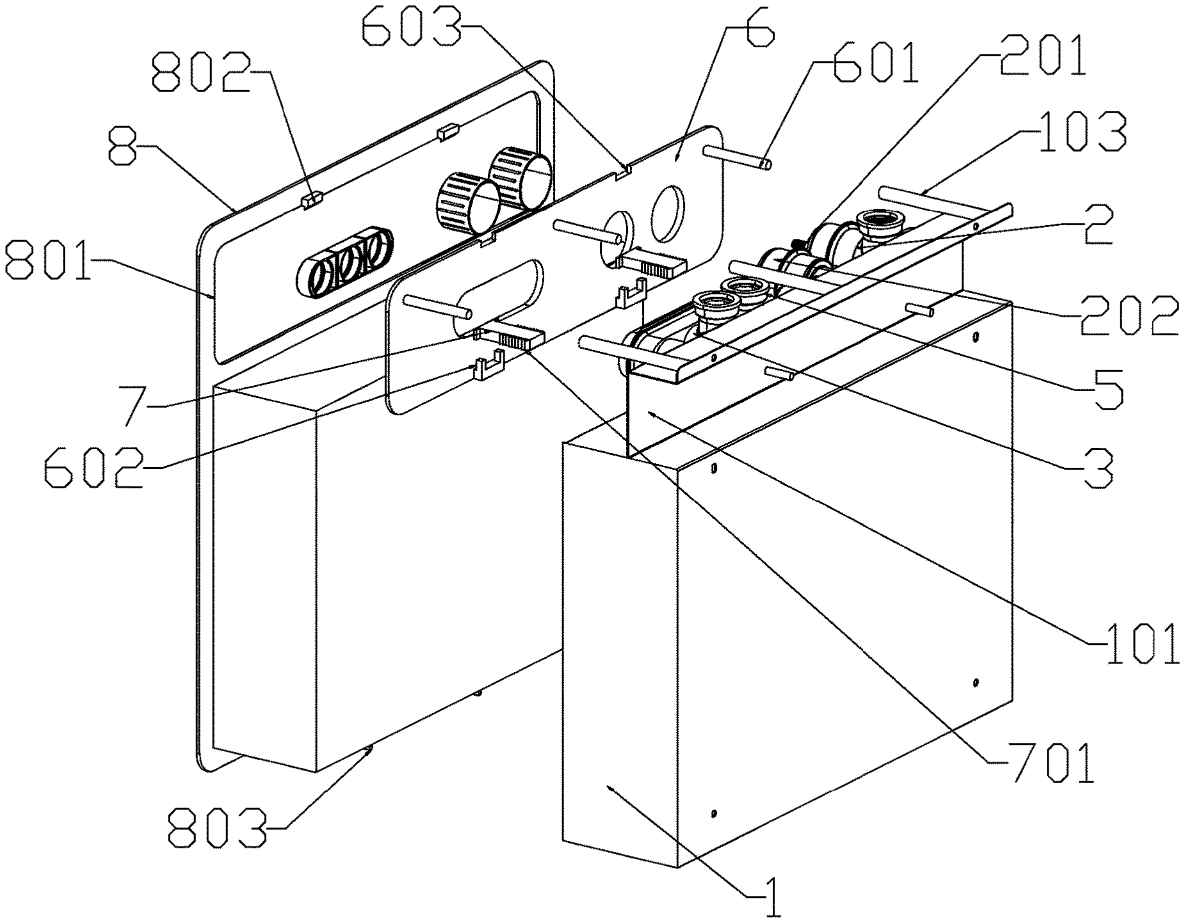
FIG. 3 is a schematic diagram of the built-in bottom box, a decorative cover plate, an external decorative panel of the embedded storage type shower device in an embodiment of the present disclosure.
Figure 4:
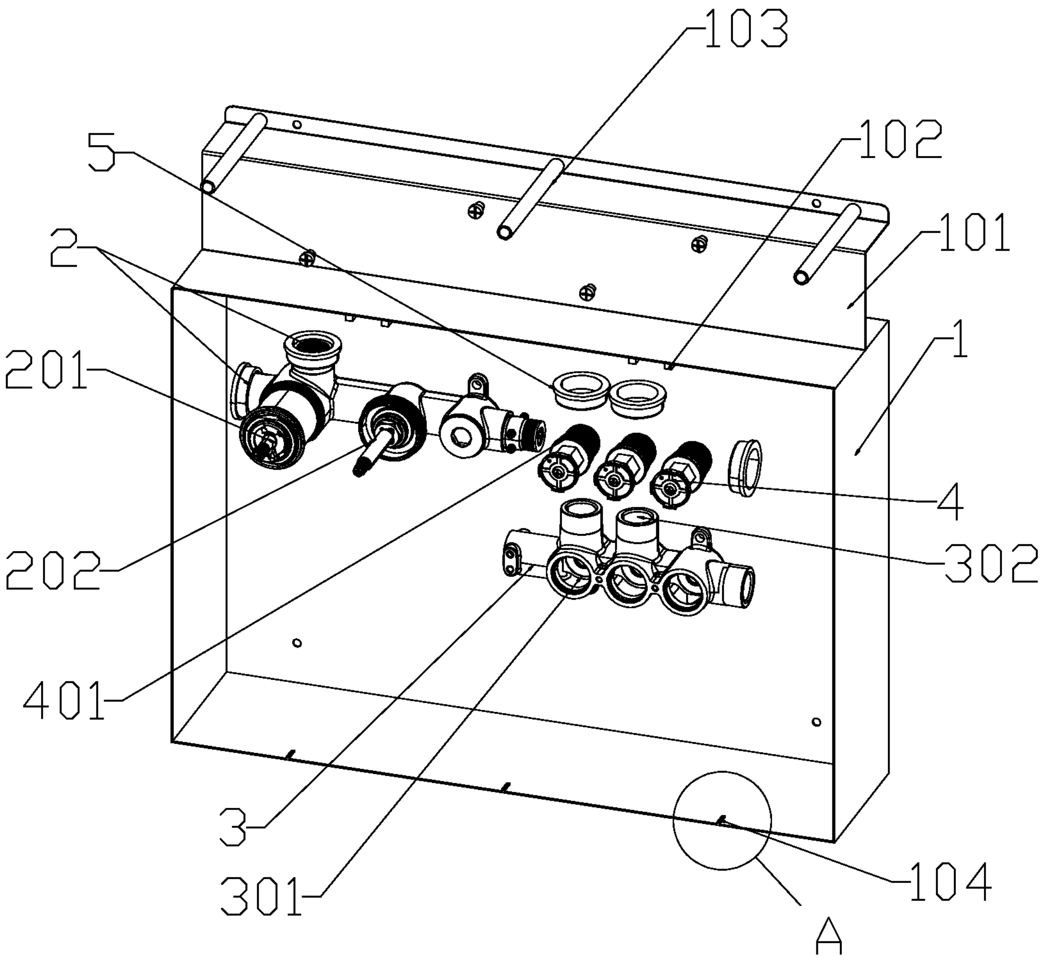
FIG. 4 is a schematic diagram of a disassembly structure of the built-in bottom box, a main water supply pipe, a water distribution valve, and a press switch of the embedded storage type shower device in an embodiment of the present disclosure.
Figure 5:
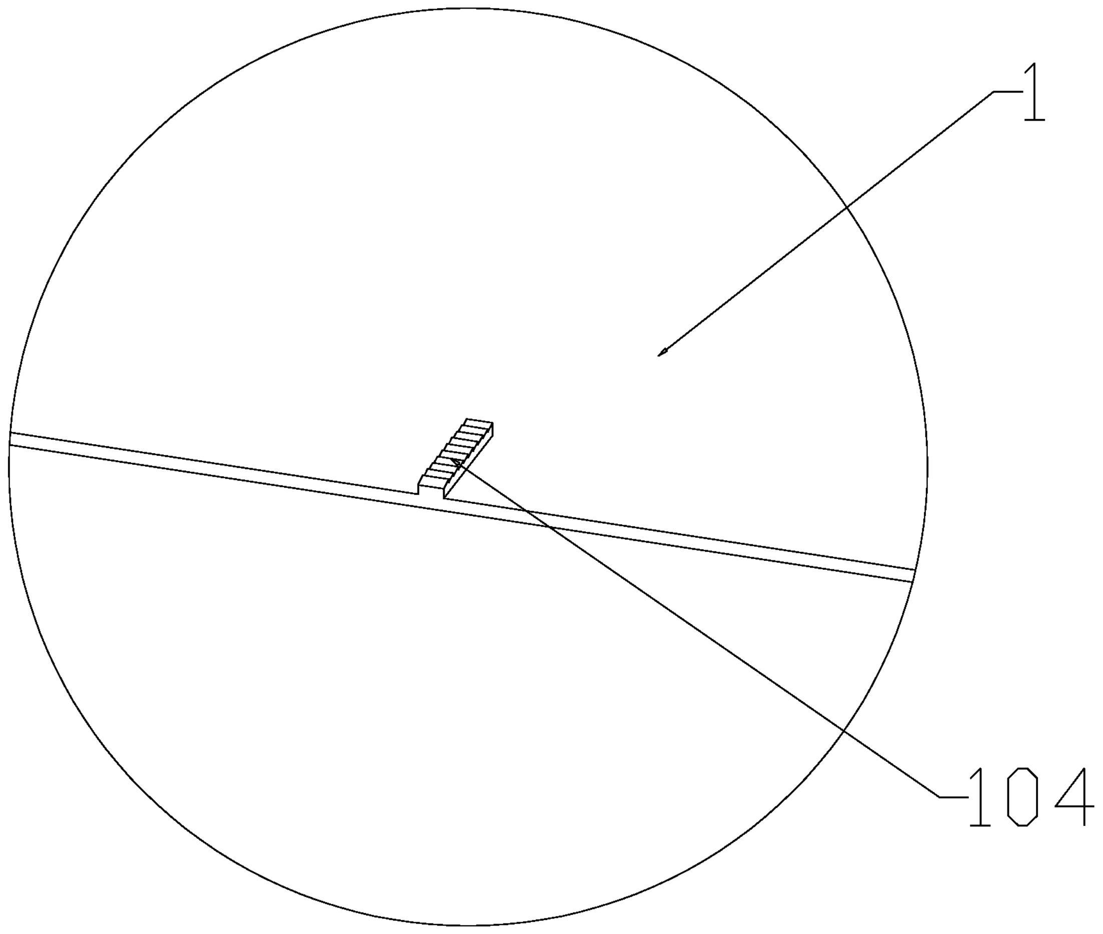
FIG. 5 is a schematic diagram of an enlarged structure at point A of FIG. 4 of the embedded storage type shower device of an embodiment of the present disclosure.
Figure 6:
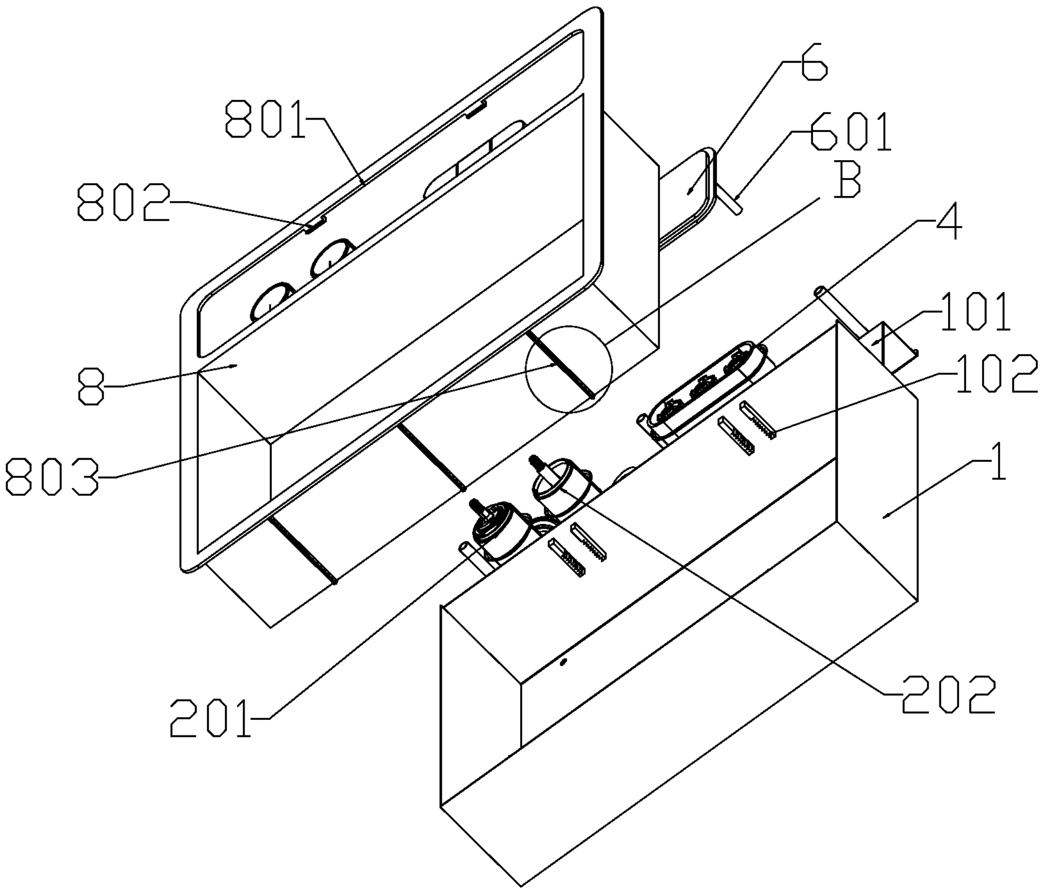
FIG. 6 is a schematic diagram of the build-in bottom box, decorative cover plate, and external decorative panel of the embedded storage type shower device according to an embodiment of the present disclosure.
Figure 7:
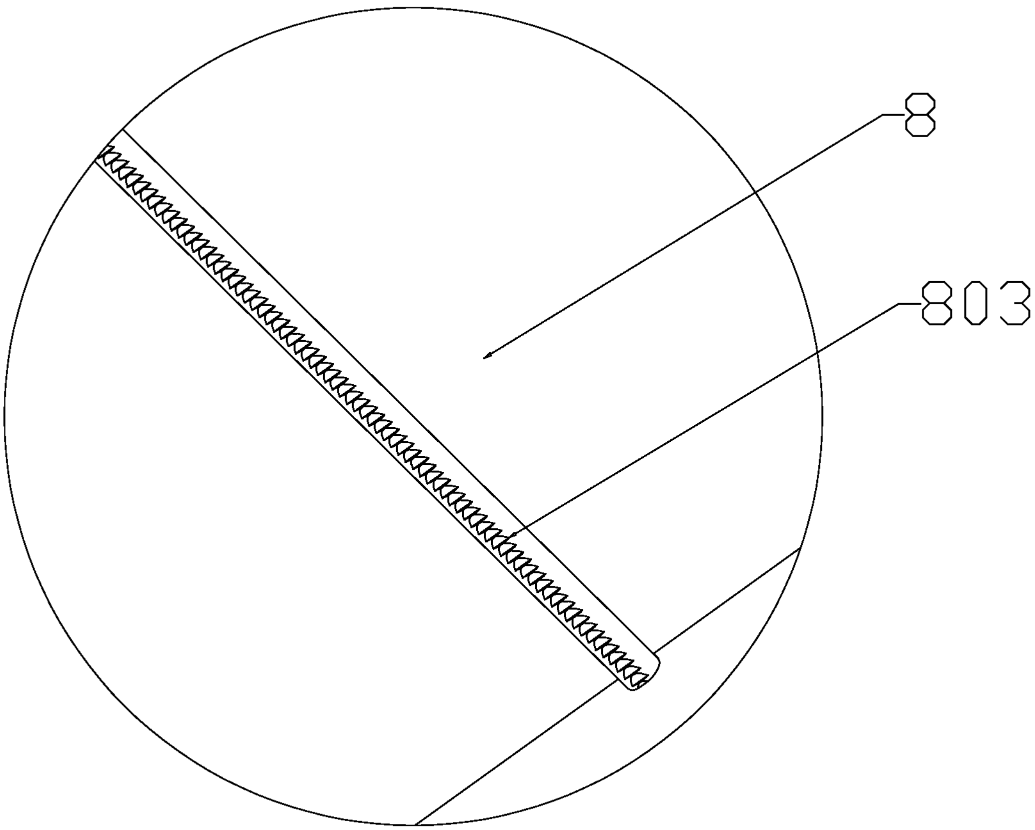
FIG. 7 is a schematic diagram of an enlarged structure at point B of FIG. 6 of the embedded storage type shower device of an embodiment of the present disclosure.
Figure 8:
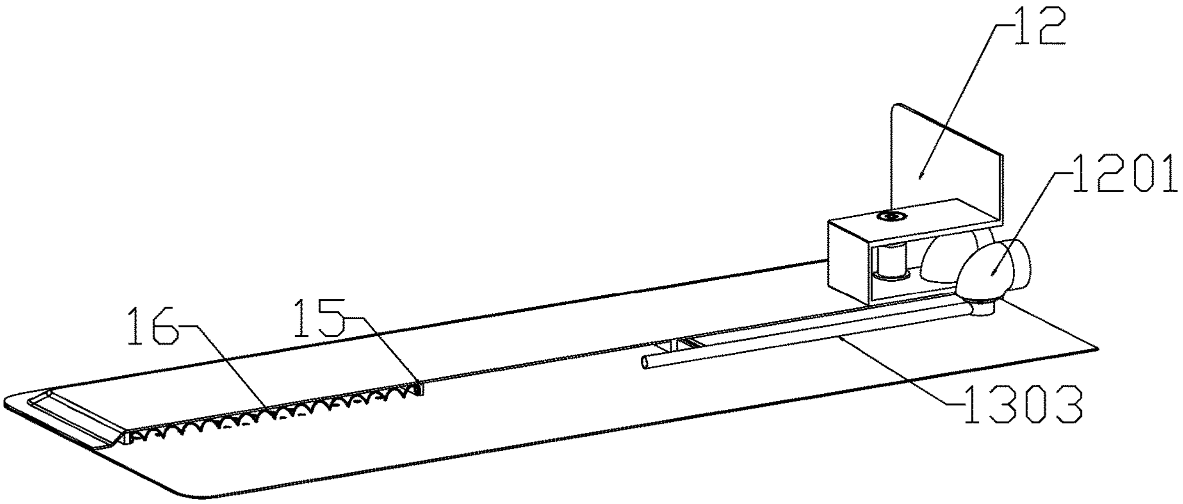
FIG. 8 is a schematic diagram of a top sectional structure of a top spray part of the embedded storage type shower device in an embodiment of the present disclosure.
Figure 9:
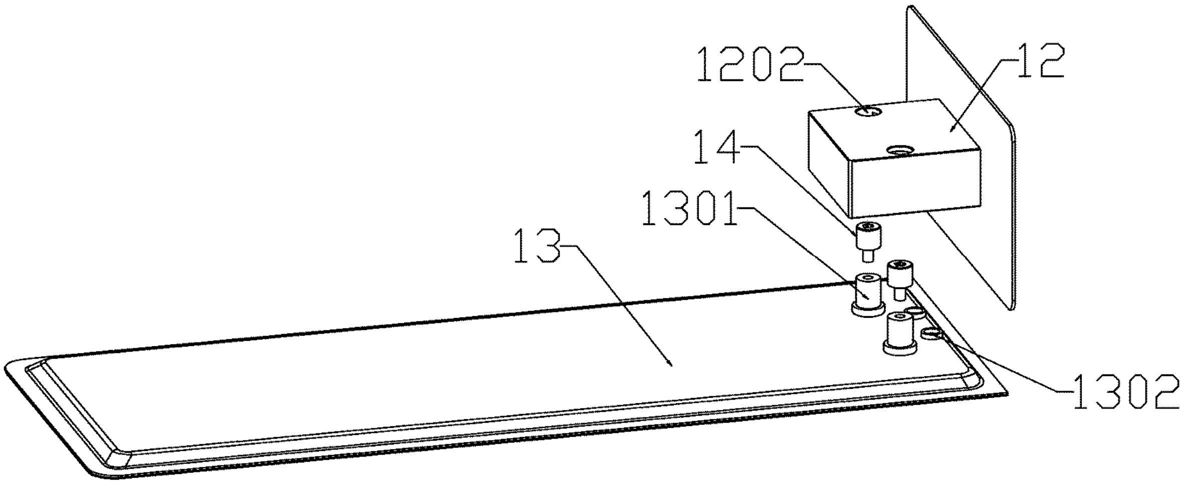
FIG. 9 is a schematic diagram of a side structural view of a top spray fixed seat, a top spray part, and a fixed bolt of the embedded storage type shower device in an embodiment of the present disclosure.
Figure 10:
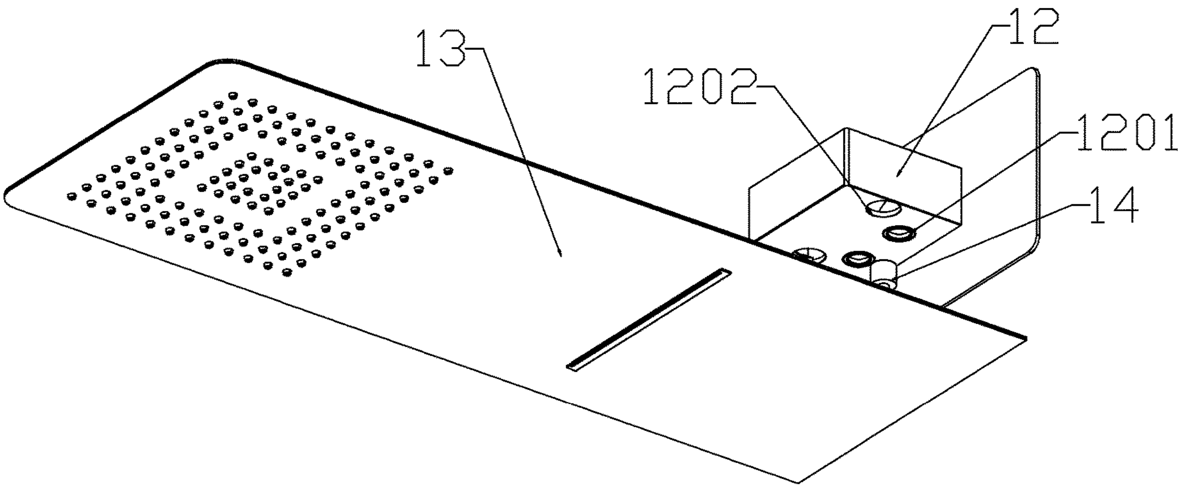
FIG. 10 is a schematic diagram of the top spray fixed seat, top spray part, and fixed bolt of the embedded storage type shower device in an embodiment of the present disclosure, when viewed from the top.

Please Refer to FIGS. 1 to 10:

The present disclosure provides an embedded storage type shower device, including a built-in bottom box 1; a front top of the built-in bottom box 1 is fixedly provided with a main water supply pipe 2 and a water distribution valve 3. A front side of the water distribution valve 3 is thread connection with three press switches 4. A front top of the built-in bottom box 1 is clamped with a decorative cover plate 6. A front side of the built-in bottom box 1 is clamped with an external decorative panel 8. Two water outlets 302 at a top of the water distribution valve 3 and a water outlet 302 at a right side thereof are connected with a branch pipe 11, an end of the branch pipe 11 connected to a water outlet 302 at a top of the water distribution valve 3 is connected to a top spray fixed seat 12. A bottom of the top spray fixed seat 12 is fixedly connected to a top spray part 13. An end of the branch pipe 11 connected to the water outlet 302 at the right side of the water distribution valve 3 is connected to a shower installation seat 17, which is connected to a handheld shower 18 through a hose.

The built-in bottom box 1 is embedded in a wall, an L-shaped installation convex frame 101 is fixedly provided on a top of the built-in bottom box 1. Three magnetic suction connection columns 103 are provided on a top of an installation convex frame 101 at an equal distance. Two limit sliding grooves 102 are symmetrically provided on an inner wall of a top of the built-in bottom box 1, a tooth groove is provided in a left and right inner wall of the limit sliding groove 102. Three sets of limit teeth 104 are provided on a front side of the inner wall of a bottom of the built-in bottom box 1 at equidistant.

A right end of a main water supply pipe 2 and a left end of the water distribution valve 3 are connected to form a whole. A right end of the main water supply pipe 2 and the water distribution valve 3 are fixedly connected to an installation convex frame 101 at a top of the built-in bottom box 1 through a bolt. A temperature regulation valve 201 is provided at a connection between a left side of the main water supply pipe 2 and a top thereof that is connected to a water pipe. The main water supply pipe 2 on a right side of the temperature regulation valve 201 is provided with a water volume switch 202, a front end of the temperature regulation valve 201 and the water volume switch 202 are both clamped with a knob 9.

A water diversion 301 is provided at a corresponding position of a water outlet 302 of the water distribution valve 3. The water diversion 301 is thread connection with a press switch 4, a rear end of the press switch 4 is connected with a filter screen 401 in the water distribution valve 3. A front end of the press switch 4 is connected with a button 10, an end of each water outlet 302 is sleeved with a locking buckle 5.

Using the above technical solution, the built-in bottom box 1 will be fixed to the wall with a bolt in an early stage of construction. When installing the shower in a later stage, a right end of the main water supply pipe 2 will be connected to the left end of the water distribution valve 3, and then fixed to an installation convex frame 101 with a bolt. The left side and top of the main water supply pipe 2 will be connected to the water pipe, water temperature will be controlled through the temperature regulation valve 201. The water volume will be controlled through the water volume switch 202, and the water outlet mode is controlled through the press switch 4 that is thread connection in the water distribution valve 3, so that bathing can be achieved through the top spray part 13 or handheld shower 18. A rear end of the press switch 4 that is thread connection in the water distribution valve 3 is connected to a filter screen 401, which is configured to filter residue in water and prevent the residue from blocking a latex hole of the top spray part 13 or handheld shower 18. The press switch 4 is thread connected to the water distribution valve 3. When the filter screen 401 at a rear of the press switch 4 is blocked, the press switch 4 can be removed to render maintenance operations more convenient.

Embodiment 2

Based on Embodiment 1, an embedded storage type shower device is provided, which is connected to a filter screen 401 at a rear end of a press switch 4 that is thread connection in a water distribution valve 3 to filter residue in water and prevent residue from blocking a latex hole of a top spray part 13 or a handheld shower 18. The embedded storage type shower device further includes: a decorative cover plate 6 that is buckled to a front side of the main water supply pipe 2 and the water distribution valve 3, a top of a rear wall of the decorative cover plate 6 is provided with three magnetic suction columns 601 at an equal distance. A rear end of the magnetic suction column 601 is inserted into a magnetic suction connection column 103 at a top of the built-in bottom box 1. Two "T" shape connection slots 602 are symmetrically provided at a bottom of a rear wall of the decorative cover plate 6. A "T" shape limit clamp block 7 is inserted into a connection slot 602, a fixed tooth 701 is provided on a left and right side of a rear end of a limit clamp block 7, a top of the decorative cover plate 6 is symmetrically provided with two fixed clamp groove 603.

A rectangular arc-shaped cover groove 801 is provided at a top of a front side wall of an external decorative panel 8, which is clamped on a front side of the decorative cover plate 6. Two connection clamp blocks 802 are symmetrically provided on a top and rear side of the cover groove 801, the connection clamp block 802 is clamped in a fixed clamp groove 603 provided at a top of the decorative cover plate 6. A bottom of a front side wall of the external decorative panel 8 is concave to form a storage groove. Three limit rods 803 are equidistant from a bottom of a rear side wall of the external decorative panel 8, a bottom of the limit rod 803 is provided with a tooth groove, a bottom of the limit rod 803 is clamped to a top of the limit tooth 104 of the built-in bottom box 1.

Using the above technical solution, by connecting the front end of the limit clamp block 7 to the connection slot 602 at the bottom of the rear end of the decorative cover plate 6, and then the magnetic suction column 601 and the limit clamp block 7 are used to match the magnetic suction connection column 103 of the decorative cover plate 6 and the built-in bottom box 1 with the limit sliding groove 102, the decorative cover plate 6 can be blocked on the front side of the main water supply pipe 2 and the water distribution valve 3 for aesthetic decoration. The external decorative panel 8 is connected to the fixed clamp groove 603 of the decorative cover plate 6 and the limit tooth 104 of the built-in bottom box 1 by connecting the connection clamp block 802 and the limit rod 803, respectively, so that the external decorative panel 8 is clamped on the front side of the decorative cover plate 6 and the built-in bottom box 1 to avoid blocking the decorative cover plate 6. Moreover, the bottom of the front side wall of the external decorative panel 8 is concave to form a storage groove, which can temporarily store a shower supply, so as to improve a convenience of taking an item during showering.

Embodiment 3

Based on Embodiment 1, an embedded storage type shower device is provided. The device is connected to a filter screen 401 at a rear end of a press switch 4 that is thread connection in the water distribution valve 3, which is configured to filter residues in water and prevent the residues from blocking a latex hole of a top spray part 13 or handheld shower 18. The embedded storage type shower device further includes: a top spray fixed seat 12 that is in a "凵" shape, two splitter pipe 1201 are provided in the top spray fixed seat 12, a rear end of the splitter pipe 1201 is connected to a branch pipe 11, a bottom of the splitter pipe 1201 is inserted into a connection port 1302 at a top and rear end of the top spray part 13. Two fixed connection holes 1202 are symmetrically provided at a top of a front end of the top spray fixed seat 12.

There are two ways of water outlet at a bottom of the top spray part 13. A partition is provided in a middle of an inner cavity of the top spray part 13, a connection port 1302 is connected to a front side of the inner cavity of the top spray part 13 through the partition. Two fixed columns 1301 are symmetrically inserted into the fixed connection hole 1202 of the top spray fixed seat 12 at a top rear side of the top spray part 13, and connected by a fixed bolt 14. A front side of the inner cavity of the top spray part 13 is connected to a push scraper 15 in a sliding manner, three springs 16 are provided between a front side of the push scraper 15 and a front wall of the inner cavity of the top spray part 13 at an equal distance.

Using the above technical solution, before construction, the top spray fixed seat 12 is installed at a required height. Then, when the top spray part 13 is connected upwards from a bottom of the top spray fixed seat 12, two fixed columns 1301 are inserted into the fixed connection hole 1202 of the top spray fixed seat 12, them are connected with a fixed bolt 14. The connection port 1302 at a top of the top spray part 13 is then inserted into a bottom of the splitter pipe 1201, the top spray part 13 can be fixed at a bottom of the splitter pipe 1201 and connected with water, a sliding connection on a front side of an inner cavity of the top spray part 13 is connected to the push scraper 15. When water is flowing, water pressure will push the push scraper 15 forward, causing normal water flow on a front side of the top spray part 13. When water is cut off, the spring 16 will push the push scraper 15 backward, thereby pushing the water backward, avoiding intermittent dripping of the top spray part 13.

The specific usage and function of this embodiment: in the water and electricity construction stage of the present disclosure, the built-in bottom box 1 is first fixed to the wall by a bolt, the branch pipe 11 is provided at a corresponding position on the wall. At the same time, the top spray fixed seat 12 is fixed on the wall, a rear end of the splitter pipe 1201 is connected to the branch pipe 11. When installing the shower in a later stage, a right end of the main water supply pipe 2 is connected to a left end of the water distribution valve 3, then them are fixed to an installation convex frame 101 with a bolt. The left and top of the main water supply pipe 2 are connected to a water pipe, and then the front end of the limit clamp block 7 is connected to a connection slot 602 at a bottom of the rear end of the decorative cover plate 6. Through a cooperation of the magnetic suction column 601 and the limit clamp block 7, the decorative cover plate 6 and the magnetic suction connection column 103 of the built-in bottom box 1 are connected to the limit sliding groove 102. The decorative cover plate 6 can be blocked on a front side of the main water supply pipe 2 and the water distribution valve 3 for aesthetic decoration. Then, the external decorative panel 8 is connected to the fixed clamp groove 603 of the decorative cover plate 6 and the limit tooth 104 of the built-in bottom box 1 by connecting the connection clamp block 802 and the limit rod 803, respectively, so that the external decorative panel 8 is stuck on a front side of the decorative cover plate 6 and the built-in bottom box 1 to avoid blocking the decorative cover plate. The bottom of the front side wall of the external decorative panel 8 is concave to form a storage groove, which can temporarily store a shower supply. When connecting the top spray part 13 from the bottom of the top spray fixed seat 12 upwards, two fixed columns 1301 are inserted into the fixed connection hole 1202 of the top spray fixed seat 12 and connected through a fixed bolt 14. The connection port 1302 at a top of the top spray part 13 is then inserted into a bottom of the splitter pipe 1201. The top spray part 13 can be fixed at a bottom of the splitter pipe 1201 and filled with water. A front side of the inner cavity of the top spray part 13 is connected to the push scraper 15 in a sliding manner. When the water is filled, the water pressure will push the push scraper 15 forward, allowing the front side of the top spray part 13 to flow normally. When the water is cut off, the spring 16 will push the push scraper 15 backward, pushing the water back to avoid intermittent dripping of the top spray part 13.

The above is only an exemplary embodiment of the present disclosure, and is not intended to limit the scope of protection of the present disclosure. The protection scope of the present disclosure is determined by the claims.

What is claimed is:

1. An embedded storage type shower device, comprising: a built-in bottom box (1); a front top of the built-in bottom box (1) is fixedly provided with a main water supply pipe (2) and a water distribution valve (3), a front side of the water distribution valve (3) is thread connection with three press switches (4), the front top of the built-in bottom box (1) is clamped with a decorative cover plate (6), a front side of the built-in bottom box (1) is clamped with an external decorative panel (8), two water outlets (302) at a top of the water distribution valve (3) and a water outlet (302) at a right side thereof are connected to a branch pipe (11), an end of the branch pipe (11) connected to the water outlet (302) at a top of the water distribution valve (3) is connected to a top spray fixed seat (12), a bottom of the top spray fixed seat (12) is fixedly connected to a top spray part (13), an end of the branch pipe (11) connected to the water outlet (302) at a right side of the water distribution valve (3) is connected to a shower installation seat (17), the shower installation seat (17) is connected to a handheld shower (18) through a hose.

2. The embedded storage type shower device as claimed in claim 1, wherein the built-in bottom box (1) is embedded in a wall, a top of the built-in bottom box (1) is fixedly provided with an "L"-shape installation convex frame (101), a top of the installation convex frame (101) is equidistantly provided with three magnetic suction connection columns (103), two limit sliding grooves (102) are symmetrically provided on an inner wall of a top inner side of the built-in bottom box (1), a left and right inner walls of the limit sliding groove (102) are provided with a teeth slot, three sets of limit teeth (104) are evenly spaced on a front side of an inner wall at a bottom of the built-in bottom box (1).

3. The embedded storage type shower device as claimed in claim 1, wherein a right end of the main water supply pipe (2) is connected to a left end of the water distribution valve (3) as a whole, the right end of the main water supply pipe (2) and the water distribution valve (3) are fixedly connected to the installation convex frame (101) at a top of the built-in bottom box (1) through a bolt, a temperature regulation valve (201) is provided at a connection between a left side of the main water supply pipe (2) and a the top thereof that is connected to a water pipe, the main water supply pipe (2) at a right side of the temperature regulation valve (201) is provided with a water volume switch (202), front ends of the temperature regulation valve (201) and the water volume switch (202) are both clamped with a knob (9).

4. The embedded storage type shower device as claimed in claim 1, wherein a water outlet (302) of the water distribution valve (3) is provided with a corresponding water diversion (301), the water diversion (301) is thread connection with the press switch (4), a rear end of the press switch (4) is connected to a filter screen (401) in the water distribution valve (3), a front end of the press switch (4) is connected to a button (10), an end of each water outlet (302) is sleeved with a locking buckle (5).

5. The embedded storage type shower device as claimed in claim 1, wherein the decorative cover plate (6) is fastened to a front side of the main water supply pipe (2) and the water distribution valve (3), three magnetic suction columns (601) are symmetrically provided at a top of a rear wall of the decorative cover plate (6) at an equal distance, a rear end of the magnetic suction column (601) is inserted into a magnetic suction connection column (103) at a top of the built-in bottom box (1), two "T"-shape connection slot (602) are symmetrically provided at a bottom of a rear wall of the decorative cover plate (6), the connection slot (602) is provided with a "T"-shape limit clamp block (7), left and right sides at a rear of the limit clamp block (7) is provided with a fixed teeth (701), two fixed clamp grooves (603) are symmetrically provided at a top of the decorative cover plate (6).

6. The embedded storage type shower device as claimed in claim 1, wherein a rectangular arc-shaped cover groove (801) is provided at a top of a front side wall of the external decorative panel (8), the cover groove (801) is clamped on a front side of the decorative cover plate (6), two connection clamp blocks (802) are symmetrically provided on a rear of the cover groove (801), the connection clamp block (802) is clamped in a fixed clamp groove (603) provided at a top of the decorative cover plate (6), a bottom of a front side wall of the external decorative panel (8) forms an inner concave shape to form a storage groove; a bottom of a rear side wall of the external decorative panel (8) is provided with three limit rods (803) at an equal distance, a bottom of the limit rod (803) is provided with a tooth groove, a bottom of the limit rod (803) is clamped to a top of the limit tooth (104) of the built-in bottom box (1).

7. The embedded storage type shower device as claimed in claim 1, wherein the top spray fixed seat (12) is in a "凸" shape, two splitter pipes (1201) are provided in the top spray fixed seat (12), a rear end of the splitter pipe (1201) is connected to the branch pipe (11), a bottom of the splitter pipe (1201) is inserted into a connection port (1302) at a top rear end of the top spray part (13), two fixed connection holes (1202) that run through are symmetrically provided at a top of a front end of the top spray fixed seat (12).

8. The embedded storage type shower device as claimed in claim 1, wherein a bottom of the top spray part (13) is provided with two water outlet modes, a partition is provided in a middle of an inner cavity of the top spray part (13), an insertion tube (1303) connected to a bottom of one connection port (1302) passes through the partition and is connected to a front of an inner cavity of the top spray part (13), a top rear of the top spray part (13) is symmetrically provided with two fixed columns (1301) inserted into the fixed connection hole (1202) of the top spray fixed seat (12) and connected by a fixed bolt (14), a front side of the inner cavity of the top spray part (13) is connected with a push scraper (15), three springs (16) are provided at a connection between a front side of the push scraper (15) and a front wall of the inner cavity of the top spray part (13) at an equal distance.

* * * * *